(12) United States Patent
Tornhill (10) Patent No.: US 11,487,535 B2
(45) Date of Patent: Nov. 1, 2022

(54) RANKING OF SOFTWARE CODE PARTS

(71) Applicant: Codescene AB, Malmö (SE)

(72) Inventor: Adam Tornhill, Malmö (SE)

(73) Assignee: Codescene AB, Malmö (SE)

( * ) Notice: Subject to any disclaimer, the term of this patent is extended or adjusted under 35 U.S.C. 154(b) by 213 days.

(21) Appl. No.: 16/648,898

(22) PCT Filed: Sep. 18, 2018

(86) PCT No.: PCT/EP2018/075181
§ 371 (c)(1),
(2) Date: Mar. 19, 2020

(87) PCT Pub. No.: WO2019/057700
PCT Pub. Date: Mar. 28, 2019

(65) Prior Publication Data
US 2020/0249941 A1    Aug. 6, 2020

(30) Foreign Application Priority Data
Sep. 20, 2017 (SE) .................... 1751166-8

(51) Int. Cl.
G06F 8/77 (2018.01)
G06F 8/75 (2018.01)

(52) U.S. Cl.
CPC . *G06F 8/77* (2013.01); *G06F 8/75* (2013.01)

(58) Field of Classification Search
CPC ...................... G06F 8/75; G06F 8/77
See application file for complete search history.

(56) References Cited

U.S. PATENT DOCUMENTS

| | | | |
|---|---|---|---|
| 8,924,932 B2* | 12/2014 | Granshaw | G06F 8/73 717/123 |
| 2008/0148225 A1 | 6/2008 | Sarkar et al. | |
| 2011/0041120 A1 | 2/2011 | Nagappan et al. | |
| 2014/0137074 A1* | 5/2014 | Hey | G06Q 10/063112 717/101 |
| 2015/0370685 A1* | 12/2015 | Heymann | G06F 11/3676 714/38.1 |

(Continued)

OTHER PUBLICATIONS

International Search Report and Written Opinion dated Dec. 5, 2018 for PCT/EP2018/075181, 13 pages.

(Continued)

*Primary Examiner* — Qing Chen
*Assistant Examiner* — Amir Soltanzadeh
(74) *Attorney, Agent, or Firm* — Sage Patent Group (57) ABSTRACT

A method of ranking a plurality of parts of a software code is disclosed for identification of one or more candidate parts of the software code for alteration. The software code is associated with a change history register indicative of previous alterations of the parts of the software code. The method includes (for each of the plurality of parts of the software code) determining a plurality of constituent metrics of the part of the software code by parsing the change history register and the software code determining an alteration recency metric for the part of the software code based on the time indications of the change history register, and scaling one or more of the constituent metrics based on the alteration recency metric.

15 Claims, 2 Drawing Sheets

(56) References Cited

U.S. PATENT DOCUMENTS

2018/0136933 A1* 5/2018 Kogan ................ G06F 16/26
2019/0026108 A1* 1/2019 Byrd ................... G06F 8/77

OTHER PUBLICATIONS

Office Action dated Sep. 20, 2019 for Swedish Patent Application No. 1751166-8, 6 pages.
Office Action dated Apr. 27, 2018 for Swedish Patent Application No. 1751166-8, 9 pages.
Tornhill, Adam, "NPL/Code Maat: A Command Line Tool to Mine and Analyze Data from Version-Contrrol Systems", https://github/adamtornhill/code-maat, Feb. 23, 2017, 8 pages.
Stevanetic, Srdjan et al.,"Software Metrics for Measuring the Understandability of Architectural Structures—A Systematic Mapping Study", EASE 15, Nanjing, China, Apr. 27-19, 2015, 14 pages.
Moura, Marcello Henrique Dias De et al., "Extracting New Metrics from Version Control System for the Comparison of Software Developers", 2014 Brazilian Symposium on Software Engineering, Sep. 28, 2014, 10 pages.

\* cited by examiner

ID 251083, https://www.hindawi.com/
RANKING OF SOFTWARE CODE PARTS

CROSS REFERENCE TO RELATED APPLICATIONS

This application is a 35 U.S.C. § 371 national stage application of PCT International Application No. PCT/EP2018/075181 filed on Sep. 18, 2018, which in turn claims priority to Swedish Patent Application No. 1751166-8 filed on Sep. 20, 2017, the disclosures and content of which are incorporated by reference herein in their entirety.

TECHNICAL FIELD

The present disclosure relates generally to the field of software code development and maintenance. More particularly, it relates to identification of software code parts as candidate parts for alteration and/or to reduction of hardware utilization for software code development.

BACKGROUND

In development and/or maintenance of software code it can be cumbersome to prioritize among different parts of the software code, e.g. to determine which parts of the software code should be the focus of error correction, improvements, or similar actions. A sub-optimal prioritization typically leads to one or more of the following problems: less compact software code, more iterations of the software development (and thereby more versions of the code, a higher number of commits, and/or more compilations of the software code), etc. These problems are typically particularly pronounced when the software code comprises a large amount of parts and/or lines of code.

There exist some approaches that attempt to solve the problem of prioritization. A few examples of such approaches include methods for code review, code analysis, and complexity metric analysis. According to such approaches, it is possible to determine whether or not a piece of code is complicated or not.

Some approaches to code analysis apply machine learning to identify quality problems and other software issues. One example of such an approach is disclosed in Y. Suresh, L. Kumar, and S. K. RathStatistical, "Machine Learning Methods for Software Fault Prediction Using CK Metric Suite: A Comparative Analysis", ISRN Software Engineering, Volume 2014, Article ID 251083, https://www.hindawi.com/journals/isrn/2014/251083/. Typically, machine learning approaches to the problem above (e.g. using supervised training and model construction) are problematic since they may not be generalized to other software code bases than the one used for its training.

Therefore, there is a need for alternative approaches to prioritize among different parts of the software code.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method of ranking a plurality of parts of a software code for identification of one or more candidate parts of the software code for alteration. The software code is associated with a change history register indicative of previous alterations of the parts of the software code, each indication of previous alteration of a part of the software code being associated in the change history register with a time indication, and the software code and the change history register are comprised in storing circuitry.

The method comprises (for each of the plurality of parts of the software code) determining a plurality of constituent metrics of the part of the software code by parsing the change history register and the software code, determining (an alteration recency metric for the part of the software code based on the time indications of the change history register, and scaling one or more of the constituent metrics based on the alteration recency metric.

The method also comprises ranking the plurality of parts of the software code based on their respective constituent metrics, and generating a signal indicative of the one or more candidate parts of the software code based on the ranking.

The plurality of constituent metrics comprises a code complexity metric of the part of the software code derived based on the software code, and a change frequency metric of the part of the software code determined based on the time indications of the change history register.

In some embodiments, the plurality of constituent metrics further comprises one or more of an architectural significance metric of the part of the software code determined based on the change history register, and a developer fragmentation metric of the part of the software code determined based on developer identities of the change history register associated with respective indications of previous alterations of the software code.

In some embodiments, the method further comprises normalizing each of the constituent metrics before the step of ranking the plurality of parts of the software code.

According to some embodiments, determining one or more of the constituent metrics comprises excluding, from the determination, previous alterations associated with a time indication outside a time window of the change history register.

The method may, according to some embodiments, further comprise determining a code complexity trend metric for each of the plurality of parts of the software code, and scaling one or more of the constituent metrics based on the code complexity trend metric before the step of ranking the plurality of parts of the software code.

In some embodiments, the method may further comprise (before the ranking step) clustering the parts of the software code into a plurality of groups based on the respective constituent metrics of each of the parts of the software code, and for each of the groups, determining a group metric based on respective constituent metrics of each of the parts of the software code of the group. Then, ranking the plurality of parts of the software code based on their respective constituent metrics may comprise ranking the plurality of groups based on their respective group metric.

According to some embodiments, the method may further comprise (for each of the plurality of parts of the software code) determining a combined metric based on the plurality of constituent metrics. Then, ranking the plurality of parts of the software code based on their respective constituent metrics may comprise ranking the plurality of parts of the software code based on their respective combined metrics.

In some embodiments, the signal indicative of the one or more candidate parts is configured to cause control of hardware utilization associated with alteration software code.

A second aspect is a hardware utilization control method comprising performing the method of ranking a plurality of parts of a software code according to the first aspect and controlling hardware utilization associated with alteration of the software code based on the signal indicative of the one or more candidate parts.

A third aspect is a computer program product comprising a non-transitory computer readable medium, having thereon a computer program comprising program instructions. The computer program is loadable into a data processing unit and configured to cause execution of the method according to the first or second aspect when the computer program is run by the data processing unit.

A fourth aspect is a computer program product comprising a computer program loadable into a data processing unit and configured to cause execution of the method according to the first or second aspect when the computer program is run by the data processing unit.

A fifth aspect is an arrangement for ranking of a plurality of parts of a software code for identification of one or more candidate parts of the software code for alteration. The software code is associated with a change history register indicative of previous alterations of the parts of the software code, each indication of previous alteration of a part of the software code being associated in the change history register with a time indication, and the software code and the change history register are comprised in storing circuitry.

The arrangement comprises controlling circuitry associated with the storing circuitry and configured to cause (for each of the plurality of parts of the software code) determination of a plurality of constituent metrics of the part of the software code by parsing of the change history register and the software code, determination of an alteration recency metric for the part of the software code based on the time indications of the change history register, and scaling of one or more of the constituent metrics based on the alteration recency metric.

The controlling circuitry is also configured to cause ranking of the plurality of parts of the software code based on their respective constituent metrics, and generation of a signal indicative of the one or more candidate parts of the software code based on the ranking.

The plurality of constituent metrics comprises a code complexity metric of the part of the software code derived based on the software code, and a change frequency metric of the part of the software code determined based on the time indications of the change history register.

A sixth aspect is an apparatus for hardware utilization control comprising the arrangement for ranking a plurality of parts of a software code according to the fifth aspect, wherein the controlling circuitry is further configured to cause control of hardware utilization associated with alteration of the software code based on the signal indicative of the one or more candidate parts.

A seventh aspect is a control node comprising the arrangement according to the fifth aspect or the apparatus according to the sixth aspect.

In some embodiments, any of the above aspects may additionally have features identical with or corresponding to any of the various features as explained above for any of the other aspects.

An advantage of some embodiments is that approaches to prioritize among different parts of the software code are provided.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where approaches to prioritize among different parts of the software code are provided.

As mentioned above, it is possible to determine whether or not a piece of code is complicated or not by application of methods for code review, code analysis, and/or complexity metric analysis. However, such approaches all focus on the current state of the software code, and not on the development and/or maintenance history of the software code. For example, it may also be relevant to the prioritization when a part of the software code was altered.

Furthermore, it would be beneficial if prioritization approaches would be self-training such that they can be applied to any software code without the problems typically experienced for machine learning prioritization in relation to software code; that generalization to other software code bases than the one used for training is not possible.

In addition, a part of software code may very well be free from errors and yet expensive to maintain. It would be beneficial if a prioritization approach could identify also such parts of software code.

In "Your Code as a Crime Scene", by Adam Tornhill (Pragmatic Programmers, ISBN-13: 978-16800500387)

complexity metrics are used in combination with a calculation of the number of revisions of each file. The resulting metric can be used to identify software code parts denoted as "hotspots", which may be beneficial for detection of various technical problems.

However, this approach may not be optimal for prioritization of software parts in the context of maintenance. Some reasons for this include that an identified hotspot may not constitute a problem at all since high complexity and many revisions do not necessarily indicate a severe problem. For example, a hotspot may identify activity which is limited to one (or a few) developers (in some embodiments, this is addressed by application of a developer fragmentation metric). Another example is when a hotspot identifies a part which is not very significant in relation to other parts of the software code (in some embodiments, this is addressed by application of an architectural significance metric). Yet another example is when a hotspot identifies a part which has constituted a problem historically, but does not anymore (in some embodiments, this is addressed by application of an alteration recency metric and/or a complexity trend metric).

Figure 1:
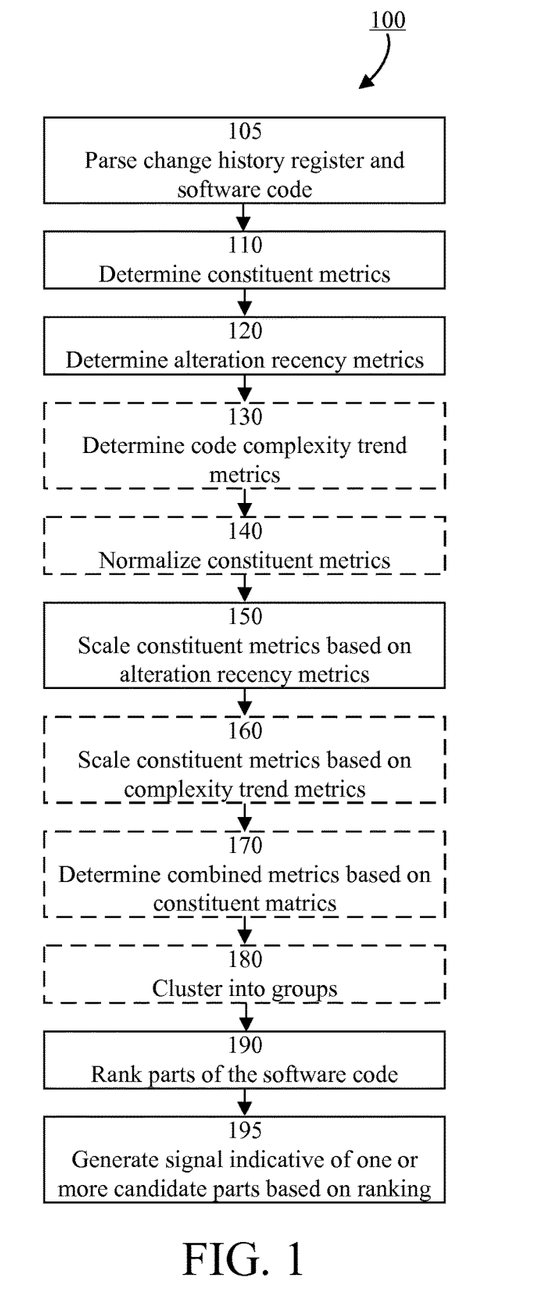
FIG. 1 is a flowchart illustrating example method steps according to some embodiments.

FIG. 1 illustrates and example method 100 according to some embodiments. The method is for ranking a plurality of parts of a software code for identification of one or more candidate parts of the software code for alteration. The software code is associated with a change history register (e.g. a version control system) indicative of previous alterations of the parts of the software code, each indication of previous alteration of a part of the software code being associated in the change history register with a time indication. The software code and the change history register are comprised in storing circuitry.

When used herein the term parts of a software code is meant to include any suitable partition of the software code. For example, a part of a software code may refer to a file, a group of files, a function, a procedure, etc.

That a part is a candidate part for alteration may, for example, be interpreted as it is a part to be prioritized for development, improvement, and/or maintenance. The candidate part for alteration may be refactoring candidates. Typically, the candidate part for alteration may be parts of the software code that are in some sense expensive to maintain (e.g. engaging a lot of different developers, affecting many other parts of the software code, and/or occupying a large amount of maintenance time).

Thus, an alteration can be interpreted as any suitable modification or revision (e.g. an addition, a deletion, a rearrangement, etc.).

The method starts by parsing the change history register and the software code in the storing circuitry as illustrated by step 105, to acquire the information needed to determine the metrics as will be described in the following.

In step 110, a plurality of constituent metrics are determined for each part of the plurality of parts of the software code. At least, the plurality of constituent metrics comprises a code complexity metric and a change frequency metric.

The code complexity metric is derived based on the software code by means of any suitable known or future algorithm for complexity analysis. For example, the complexity metric may be indicative of a size (e.g. a number of characters or a number of lines of code) of the corresponding part.

The change frequency metric is determined based on the time indications of the change history register. For example, the time indications may be used to calculate how many alterations (e.g. how many commits) the part has undergone per time unit. Typically, such a calculation is based on the number of alterations in a time window which excludes alterations that are older than a maximum trace-back time.

The plurality of constituent metrics determined in step 110 may additionally comprise one or more of an architectural significance metric and a developer fragmentation metric.

The architectural significance metric is determined based on the change history register. This metric is for describing how much impact a part has on other parts of the software code (e.g. how many associations, couplings, etc. there are between the part and other parts). For example, the architectural significance metric may be determined by determining the number of times the part has undergone an alteration together with other parts and/or by determining the number of parts undergoing alteration(s) together. Typically, such a determination is based on the alterations in a time window which excludes alterations that are older than a maximum trace-back time.

The developer fragmentation metric is determined based on developer identities of the change history register associated with respective indications of previous alterations of the software code. This metric is, typically, for describing how many different developers (or organizational groups of developers) are involved in alterations of the part. For example, this metric may be determined by calculating how many different developer identities are associated with alterations of the part. Typically, such a calculation is based on the alterations in a time window which excludes alterations that are older than a maximum trace-back time. Alternatively or additionally, the developer fragmentation metric may be for describing how distributed alterations of a part are among the developer organization.

In step 120, an alteration recency metric is determined for each the part of the software code based on the time indications of the change history register. For example, the time indications may be used to determine how long ago the most recent alteration to the part took place. Alternatively or additionally, the alteration recency metric may be determined via calculation of how many alterations the part has undergone per time unit in a time window which excludes alterations that are older than a recency trace-back time (which is typically more recent that the maximum trace-back time).

Thus, generally determining one or more of the constituent metrics may, according to some embodiments as exemplified above, comprise excluding previous alterations associated with a time indication outside a time window of the change history register. The time window may be a sliding window. Alternatively or additionally, different weights may be applied in the determination of one or more of the constituent metrics, where the weights depend on how recent the previous alteration is, i.e. a type of filtering.

The alteration recency metric is used in step 150 to scale one or more of the constituent metrics.

In some embodiments, one or more (e.g. each) of the constituent metrics may be normalized as illustrated by optional step 140. Typically, such normalization is performed before scaling by the alteration recency metric in step 150. Normalization may comprise scaling the metrics to a value between 0 and 1, which is typically accomplished by dividing all metric values for the same type of metric by a largest possible value for that type of metric or by the largest value among the metric values to be normalized.

As illustrated by optional step 130, a code complexity trend metric may be determined for each of the plurality of parts. The code complexity trend may be used to further scale one or more of the constituent metrics as illustrated by optional step 160.

For example, the code complexity metric of the part determined in step 110 and in one or more earlier executions of the method 100 may be used to determine whether (and how much) the complexity is decreasing over time for the part. This will be exemplified further in connection to FIG. 3.

The code complexity trend metric may be given a high value if the complexity is not decreasing, a medium value if the complexity is decreasing slowly, and a low value if the complexity is decreasing fast (the values being continuous or quantified). In a typical embodiment, the code complexity trend metric is given the value 0 if the code complexity metric has decreased more than a threshold value during a specified duration of time, and the value 1 otherwise. The threshold value may be given as an absolute or relative value.

In step 190, the parts of the software code are ranked based on their respective constituent metrics. Ranking in this context is meant to denote a relative prioritization among the parts.

Thus, the ranking may comprise ordering the parts relative each other; ordering each part relative other parts. It should be noted that two or more parts may be ranked equally according to some embodiments, thereby denoting them to be equally prioritized.

Furthermore, the ranking may be performed among groups of parts instead of among individual parts. This may, for example, be accomplished by first clustering (or grouping) the plurality of parts into groups as illustrated by optional step 180. The clustering may for example be performed based on one or more of the respective constituent metrics, such that parts having similar metric values are clustered into the same group. The clustering may be implemented using any suitable known or future clustering algorithm. When the ranking is performed among groups, the ranking may be based on a determined group metric rather than on the constituent metrics of the individual parts of the group.

If a high rank is interpreted as highly prioritized, the following may typically apply for each of the constituent metrics:
 a relatively high complexity metric value gives a relatively high rank contribution,
 a relatively high change frequency metric gives a relatively high rank contribution,
 a relatively high architectural significance metric gives a relatively high rank contribution, and
 a relatively high a developer fragmentation metric gives a relatively high rank contribution.

In step 195, a signal indicative of the one or more candidate parts of the software code is generated based on the ranking. For example, the signal may be input to a user interface for communicating (part of) the ranking to a user, e.g. a user associated with the organization of the developers. The user may, for example, be provided with a list of the most prioritized parts of the software code (e.g. determined as a predetermined number of highest ranked parts or as all parts for which some metric value exceeds a prioritization threshold). Alternatively or additionally, the signal may be input to storing circuitry (e.g. a memory) for storing of (part of) the ranking.

In some embodiments, the constituent metrics are combined, as illustrated by optional step 170, to a combined metric before the ranking of step 190 and, if applicable, before the clustering of step 180. The combined metric may, for example, be a scalar value (e.g. a, possibly weighted, average of the constituent metric values, or a sum of the constituent metric values) or a vector comprising the constituent metric values.

In embodiments where a combined metric is determined, the scaling of step 150 and/or the scaling of step 160 may possibly be applied to the combined metric instead of the constituent metrics.

Interaction between the various steps of the example method 100 may be exemplified as follows. The change frequency metric and the alteration recency metric are determined based on time indications of the change history register, and the signal indicative of the one or more candidate parts of the software code for alteration is based on the ranking of the constituent metrics, at least one of which is scaled by the alteration recency metric.

An example effect of application of the example method 100, whereby a ranking of candidate parts for alteration is indicated, is that the software development can be performed more efficiently, e.g., resulting in more compact software code, less iterations of the software development (and thereby fewer versions, fewer commits, and/or fewer compilations of the software code), etc.

This effect may in turn lead to the effect of decreased hardware utilization. For example, a more compact software code needs less memory resources for storing it; when there are fewer versions and/or fewer commits of the software code, less memory resources (storing circuitry) is needed for storing the versions and/or the content of the change history register; fewer compilations of the software code needs less processing capacity and fewer commits entails fewer write operations being made to hardware (storing circuitry) storing the software code and/or the content of the change history register; etc.

One way to achieve or enhance one or more of the above effects is to let the signal indicative of the one or more candidate parts be configured to cause control of hardware utilization associated with alteration software code. In fact, a method of hardware utilization control may comprise performing the example method 100 and controlling hardware utilization associated with alteration of the software code based on the signal indicative of the one or more candidate parts.

Controlling hardware utilization based on the signal indicative of the one or more candidate parts may take any suitable form. Examples include, but are not limited to the ones presented in the following.

Software parts may be selected for alteration based on (e.g., in accordance with) the indication of the signal. For example, if the signal indicates one or more (typically top-ranked) software parts, these software parts may be selected for alteration. Selection may be performed by technical means (e.g., selection circuitry; which may or may not be comprised in controlling circuitry described later herein) or by one or more users (e.g., software developers) based on a user interface indication generated from the indication of the signal.

Since the selection is based on the ranking, the alteration of the software code will typically differ—in terms of which software parts are altered and/or when software parts are altered—compared to scenarios when other rankings are applied. Thereby, the efficiency of the alteration of the software code may be improved.

Such improvements may be achieved in terms of a reduction of the overall size of the software code—thereby reducing required storing space. Alternatively or additionally, such improvements may be achieved in terms of a reduction of the number of alterations of the code—thereby reducing the overall size of the change history register (since there are fewer commits) and hence reducing required storing space, and/or processor capacity utilization (since there are fewer compilations.

Figure 2:
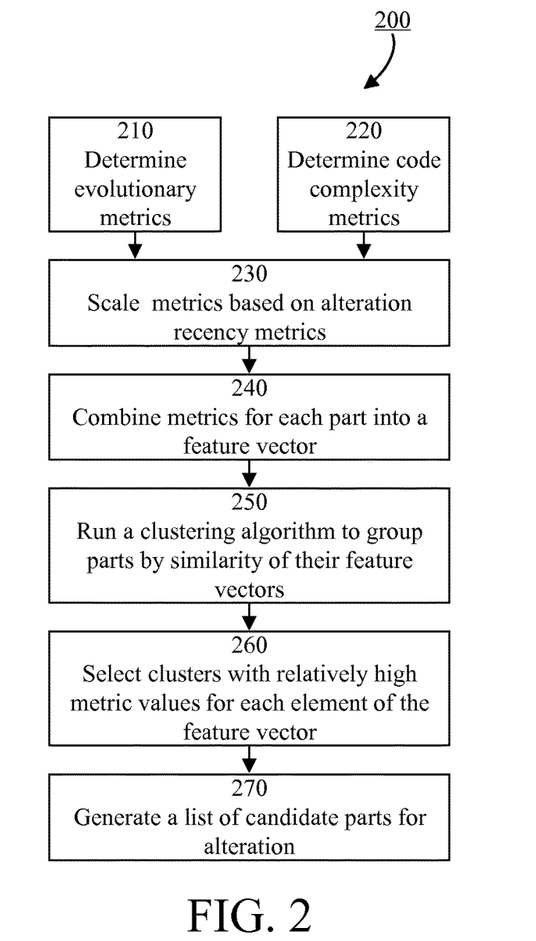
FIG. 2 is a flowchart illustrating example method steps according to some embodiments.

FIG. 2 illustrates an example method 200 according to some embodiments. The method 200 may be seen as a special case of the method 100 illustrated in FIG. 1. In the following description, the algorithm according to some embodiments (and in particular the approach illustrated in FIG. 2) will be referred to as Prioritizing Refactoring Candidates (PRC). Furthermore, part will be exemplified by file and the terms file and part will be used interchangeably without being intended as limiting.

In step 210, evolutionary metrics are determined for the different parts under evaluation and, in step 220, code complexity metrics are determined for the different parts under evaluation (compare with steps 110 and 120 of FIG. 1).

Typically, the determination of step 220 may involve application of a suitable complexity measure of the software industry, for example, McCabe Cyclomatic Complexity or a Lines-of-Code measure. The determination of step 220 may be performed by iterating through all files (or other types of parts) in the software code (also referred to as the code base) and calculate the code complexity metric for each one of them.

The evolutionary metrics determine in step 210 may, for example, correspond to one or more of the change frequency metric, the architectural significance metric, the developer fragmentation metric, and the alteration recency metric as described above.

Typically, the determination of step 210 may be performed by mining the version control history (compare with the parsing of the change history register of step 105 of FIG. 1). Information may be extracted associated with each previous alteration (commit) of interest. As indicated above, such information may typically include indications of the programmer who did the alteration (a type of developer identify), the files (a type or part) that were altered in the revision, and the time (e.g. a date) when the alteration took place (a type of time indication).

The change frequency metric may be exemplified by a measure of code change rate; a measure of how often a source code file (a part of the software code) is modified.

The developer fragmentation metric may be exemplified as a measure of how many different developers have contributed to a source code file (a part of the software code) and how fragmented their contributions are. To determine how fragmented contributions are, any suitable fragmentation measure may be calculated, e.g. one based on the disclosure in M. d'Ambros, M. Lanza, and H. Gall, "Fractal Fingers: Visualizing Development Effort for CVS Entities", $3^{rd}$ IEEE International Workshop on Visualizing Software for Understanding and Analysis (VISSOFT) 2005.

The architectural significance metric may be exemplified as a measure of how significant the file (a part of the software code) is from an architectural perspective; e.g. in terms of the number of times any other file has been changed together with this file. The rationale behind this metric is that parts that are often altered together with other parts should typically be central to the software system.

The alteration recency metric may be exemplified by an amount of recent modifications and/or an indication of the time since the last significant change took place. In typical applications, the time may be measured with a resolution of months. A significant change may, for example, be defined as an alteration when more than a single line of code is added or modified.

Typically, at least some of the metrics determined in steps 210 and 220 are normalized (compare with step 140 of FIG. 1), e.g. to a value between 0 and 1, where 1 may denote the highest score (most complex code, code with most changes, etc.). For example, all metrics except the alteration recency metrics may be normalized, or all of the metrics may be normalized. If the alteration recency metrics is normalized, one example is to let the value 1 correspond to the shortest time duration among the parts since the most recent change was made for that part and the value 0.01 correspond to the longest time duration among the parts since the most recent change was made for that part.

In step 230, the (possibly normalized) metrics determined in steps 210 and 220 are weighted (scaled) based on the alteration recency metrics (compare with step 150 of FIG. 1). In a typical example where the alteration recency metrics is normalized, step 230 may comprise multiplying the alteration recency metrics by each one of the other metrics of each file.

In step 240, the metrics for each part are combined into a feature vector for each part (compare with step 170 of FIG. 1). For example, the vector may contain normalized values of code complexity metric, change frequency metric, developer fragmentation metric and architectural significance metric.

A clustering algorithm is run in step 250 (compare with step 180 of FIG. 1) to group parts by similarity of their feature vectors. For example, an unsupervised machine learning algorithm for clustering may be used in this step, such as k-means clustering.

In step 260, clusters (groups) are selected based on their feature vectors (compare with step 190 of FIG. 1). For example, clusters with relatively high metric values for each of the elements of the feature vector may be selected. This selection may be performed as suitable depending on the importance of the different metrics. In some embodiments, the clusters are selected that score highest in most dimensions of the vector compared to the other clusters.

The selected cluster(s) may be seen to denote the most prioritized part(s) of the software code (most prioritized source code file(s)). The ranking may also be kept among selected clusters such that one (or some) of the selected clusters may be seen to denote the firstly prioritized part(s), one (or some) of the selected clusters may be seen to denote the secondly prioritized part(s), and so on. In step 270, a list of candidate parts for alteration is generated (compare with steps 190 and 195 of FIG. 1) based on the selection of step 260.

Figure 3:
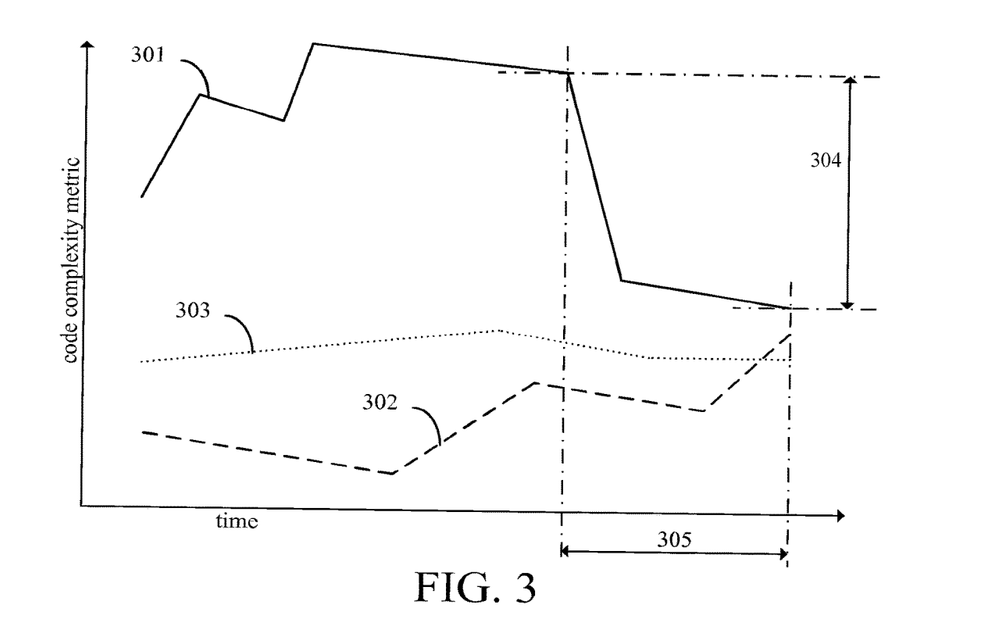
FIG. 3 is a schematic plot illustrating example code complexity metrics according to some embodiments.

FIG. 3 schematically illustrates an example for three different parts of software code of how the corresponding code complexity metrics 301, 302, 303 develop over time. From this information, a code complexity trend metric may be determined (compare with step 130 of FIG. 1). For example, the code complexity trend metric for the part corresponding to the code complexity 301 may be determined via the ratio calculated by dividing the (signed) difference 304 in code complexity metric values by the duration of a time window 305, and similarly for 302 and 303. In some embodiments, the code complexity trend metric may be set to 0 if the ratio is less than a threshold value. If the ratio is not less than the threshold value, the code complexity trend metric may be set to 1, for example.

Figure 4:
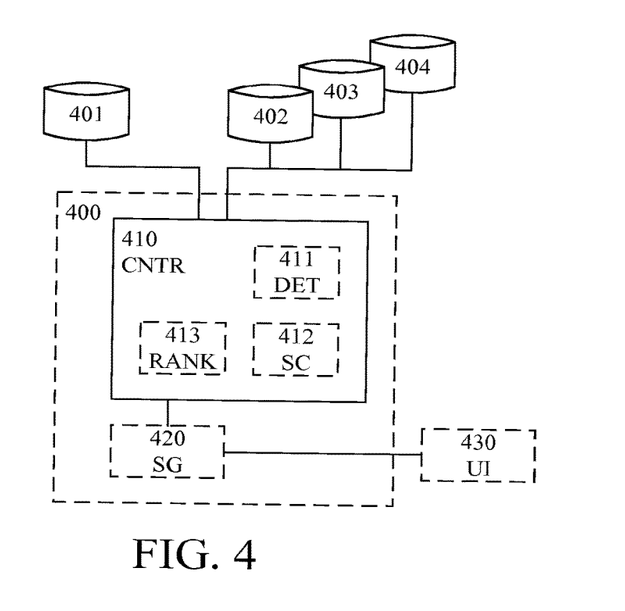
FIG. 4 is a schematic block diagram illustrating an example arrangement according to some embodiments.

FIG. 4 schematically illustrates an example arrangement according to some embodiments. The example arrangement may, for example, be comprised in a control node 400, and/or may be configured to cause performance of one or more of the method steps explained in connection to any of the FIGS. 1 and 2.

Thus, the arrangement is for ranking of a plurality of parts of a software code for identification of one or more candidate parts of the software code for alteration, wherein the software code is associated with a change history register indicative of previous alterations of the parts of the software code, and herein each indication of previous alteration of a part of the software code is associated in the change history register with a time indication.

The software code and the change history register are comprised in storing circuitry accessible by the arrangement, illustrated in FIG. 4 as databases 401, 402, 403, 404. It should be noted that any suitable storage circuitry (databases, memory circuitry, registers, etc.) may be used for the purpose of storing the software code and the change history register. The storage circuitry may comprise more than one physical storage unit (possibly in different devices and/or in different geographical locations) or a single physical storage unit, and the software code and the change history register may be comprised in the same or different storage units. In FIG. 4, the software code is distributedly stored in the databases 402, 403, 404 and the change history register is stored in the database 401.

The arrangement comprises controlling circuitry (CNTR, e.g. a controller) 410 associated with the storing circuitry (i.e. the storing circuitry is accessible to the controlling circuitry).

The controlling circuitry 410 is configured to cause (for each of the plurality of parts of the software code) determination of a plurality of constituent metrics (comprising a code complexity metric and a change frequency metric) of the part of the software code by parsing of the change history register and the software code, determination of an alteration recency metric for the part of the software code based on the time indications of the change history register, and scaling of one or more of the constituent metrics based on the alteration recency metric. For example, the determinations may be performed by determination circuitry (e.g. a determiner—DET) 411 and the scaling may be performed by scaling circuitry (e.g. a scaler—SC) 412. The determination circuitry and/or the scaling circuitry may be comprised in the controlling circuitry 410 as illustrated in FIG. 4, or the determination circuitry and/or the scaling circuitry may be otherwise associated with the controlling circuitry 410.

The controlling circuitry 410 is also configured to cause ranking of the plurality of parts of the software code based on their respective constituent metrics, and generation of a signal indicative of the one or more candidate parts of the software code based on the ranking. For example, the ranking may be performed by ranking circuitry (e.g. a ranker—RANK) 413 and the generation may be performed by signal generating circuitry (e.g. a signal generator—SG) 420. The ranking circuitry may be comprised in the controlling circuitry 410 as illustrated in FIG. 4, or it may be otherwise associated with the controlling circuitry 410. Similarly, the signal generating circuitry may be comprised in the controlling circuitry 410, or it may be otherwise associated with the controlling circuitry 410 as illustrated in FIG. 4. As exemplified above, the generated signal may be used as input to a user interface (UI) 430.

Hence, according to some embodiments, a mechanism to automatically prioritize refactoring candidates in a code base is provided. Refactoring candidates may be defined as source code parts that are expensive to maintain.

As mentioned before, there exist some other approaches that attempt to solve the problem of how to prioritize among parts of a software code. One limitation of methods based on code complexity only is that a piece of code is not necessarily a problem just because it is complex. Form the maintenance perspective, it is only a problem if it needs a lot of work and code complexity metrics do not reflect such circumstances.

In contrast, PRC according to some embodiments provides a prioritized list of source code files that are the most expensive to maintain; e.g. at risk for defects and/or team productivity bottlenecks. This list may, typically, be determined based on assumptions that parts of the software code are likely to be a maintenance problem if they:

have high complexity,
are modified often,
are modified by many different programmers,
are significant from an architectural perspective, and
have been worked on recently.

An advantage of PRC according to some embodiments is that the unsupervised machine learning algorithm of PRC does not require training, and thus generalizes to all code bases. Instead of giving an absolute result PRC delivers a relative prioritization within a code base ("In this code base, these files are most important to attend to.").

By application of code complexity trend metrics according to some embodiments as exemplified above, it is possible to exclude recently refactorized files from the prioritized list. If code complexity trend metrics are not used, it may happen that PRC sometimes delivers refactoring candidates as prioritized even if they have been refactorized recently and no longer pose a maintenance problem. This may be the case if a file has been a problem historically and thereby scores high on most evolutionary metrics. Application of code complexity trend metrics may be seen as application of a filter that discards—from consideration as refactoring candidates—files that show a strong decrease in code complexity.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. The general purpose circuitry may, for example, be associated with or comprised in an apparatus such as a control node, such as a server node.

Embodiments may appear within an electronic apparatus comprising arrangements, circuitry, and/or logic according to any of the embodiments described herein. Alternatively or additionally, an electronic apparatus may be configured to perform methods according to any of the embodiments described herein.

Figure 5:
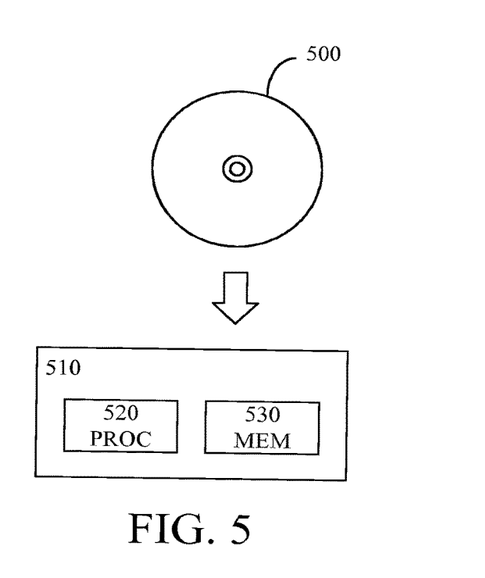
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in an electronic apparatus 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIGS. 1 through 2 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method of ranking a plurality of parts of a software code for identification of one or more candidate parts of the software code for alteration,
    wherein the software code is associated with a change history register indicative of previous alterations of the parts of the software code, each indication of previous alteration of a part of the software code being associated in the change history register with a time indication, and
    wherein the software code and the change history register are comprised in storing circuitry,
    the method comprising:
    for each of the plurality of parts of the software code, determining a plurality of constituent metrics of the part of the software code by parsing the change history register and the software code, the plurality of constituent metrics comprising:
    a code complexity metric of the part of the software code derived based on the software code; and
    a change frequency metric of the part of the software code determined by using the time indications of the change history register to calculate how many alterations the part has undergone per time unit, wherein the calculation is based on a number of alterations in a first time window which excludes alterations that are older than a maximum trace-back time;
    for each of the plurality of parts of the software code, determining an alteration recency metric for the part of the software code by using the time indications of the change history register to determine how long ago the most recent alteration to the part took place and/or to calculate how many alterations the part has undergone per time unit in a second time window which excludes alterations that are older than a recency traceback time which is more recent than the maximum trace-back time;
    for each of the plurality of parts of the software code, scaling one or more of the constituent metrics based on the alteration recency metric;
    ranking the plurality of parts of the software code based on their respective constituent metrics; and
    generating a signal indicative of the one or more candidate parts of the software code based on the ranking.

2. The method of claim 1 wherein the plurality of constituent metrics further comprises one or more of:
    an architectural significance metric of the part of the software code determined based on the change history register; and
    a developer fragmentation metric of the part of the software code determined based on developer identities of the change history register associated with respective indications of previous alterations of the software code.

3. The method of claim 1 further comprising normalizing each of the constituent metrics before the step of ranking the plurality of parts of the software code.

4. The method of claim 1 wherein determining one or more of the constituent metrics comprises excluding, from the determination, previous alterations associated with a time indication outside a time window of the change history register.

5. The method of claim 1 further comprising:
    determining a code complexity trend metric for each of the plurality of parts of the software code; and
    scaling one or more of the constituent metrics based on the code complexity trend metric before the step of ranking the plurality of parts of the software code.

6. The method of claim 1 further comprising, before the ranking step:
    clustering the parts of the software code into a plurality of groups based on the respective constituent metrics of each of the parts of the software code; and
    for each of the groups, determining a group metric based on respective constituent metrics of each of the parts of the software code of the group,
    wherein ranking the plurality of parts of the software code based on their respective constituent metrics comprises ranking the plurality of groups based on their respective group metric.

7. The method of claim 1 further comprising, for each of the plurality of parts of the software code, determining a combined metric based on the plurality of constituent metrics, and wherein ranking the plurality of parts of the software code based on their respective constituent metrics comprises ranking the plurality of parts of the software code based on their respective combined metrics.

8. The method of claim 1, wherein the signal indicative of the one or more candidate parts is configured to cause control of hardware utilization associated with alteration software code.

9. A hardware utilization control method comprising:
    performing the method of ranking a plurality of parts of a software code according to claim 1; and
    controlling hardware utilization associated with alteration of the software code based on the signal indicative of the one or more candidate parts.

10. A computer program product comprising a non-transitory computer readable medium, having thereon a computer program comprising program instructions, the computer program being loadable into a data processing unit and configured to cause execution of the method according to claim 1 when the computer program is run by the data processing unit.

11. A non-transitory computer-readable medium comprising a computer program loadable into a data processing unit and configured to cause execution of the method according to claim 1 when the computer program is run by the data processing unit.

12. An arrangement for ranking of a plurality of parts of a software code for identification of one or more candidate parts of the software code for alteration,
- wherein the software code is associated with a change history register indicative of previous alterations of the parts of the software code, each indication of previous alteration of a part of the software code being associated in the change history register with a time indication, and
- wherein the software code and the change history register are comprised in storing circuitry,
- the arrangement comprising controlling circuitry that includes programmable hardware that is associated with the storing circuitry and configured to cause:
- for each of the plurality of parts of the software code, determination of a plurality of constituent metrics of the part of the software code by parsing of the change history register and the software code, the plurality of constituent metrics comprising:
- a code complexity metric of the part of the software code derived based on the software code;
- a change frequency metric of the part of the software code determined by using the time indications of the change history register to calculate how many alterations the part has undergone per time unit, wherein the calculation is based on a number of alterations in a first time window which excludes alterations that are older than a maximum trace-back time;
- for each of the plurality of parts of the software code, determination of an alteration recency metric for the part of the software code by using the time indications of the change history register to determine how long ago the most recent alteration to the part took place and/or to calculate how many alterations the part has undergone per time unit in a second time window which excludes alterations that are older than a recency traceback time which is more recent than the maximum trace-back time;
- for each of the plurality of parts of the software code, scaling of one or more of the constituent metrics based on the alteration recency metric;
- ranking of the plurality of parts of the software code based on their respective constituent metrics; and
- generation of a signal indicative of the one or more candidate parts of the software code based on the ranking.

13. The arrangement of claim 12, wherein the signal indicative of the one or more candidate parts is configured to cause control of hardware utilization associated with alteration software code.

14. An apparatus for hardware utilization control comprising the arrangement for ranking a plurality of parts of a software code according to claim 12, wherein the controlling circuitry is further configured to cause control of hardware utilization associated with alteration of the software code based on the signal indicative of the one or more candidate parts.

15. A control node comprising the arrangement of claim 12.

* * * * *